United States Patent [19]

Ike et al.

[11] Patent Number: 4,924,967
[45] Date of Patent: May 15, 1990

[54] EXHAUST MANIFOLD

[75] Inventors: Masahide Ike; Kunio Kawai, both of Yokohama, Japan

[73] Assignee: Nissan Motor Company, Ltd., Japan

[21] Appl. No.: 315,861

[22] Filed: Feb. 27, 1989

[30] Foreign Application Priority Data

Mar. 29, 1988 [JP] Japan .............................. 63-40284[U]

[51] Int. Cl.⁵ ............................................ B23K 35/22
[52] U.S. Cl. ................................. 181/243; 181/240; 29/157.4; 228/175; 228/263.15
[58] Field of Search ................ 181/243–249, 181/240, 252, 256; 228/175, 263.15; 29/157.4

[56] References Cited

U.S. PATENT DOCUMENTS 4,091,147  5/1978  Kanazawa et al. ......... 228/263.15 X
4,517,157  5/1985  Coad ........................... 228/263.15 X
4,558,202  12/1985  Bagwell et al. ............. 228/263.15 X
4,658,537  4/1987  Bose et al. ...................... 228/263.15

FOREIGN PATENT DOCUMENTS 63-108516  7/1987  Japan .

*Primary Examiner*—Benjamin R. Fuller
*Attorney, Agent, or Firm*—Lowe, Price, Leblanc, Becker & Shur

[57] ABSTRACT

An exhaust manifold is, which includes a plurality of steel members having the same metallic crystal structure in a range of working temperature, which are jointed with each other by permanent welding and spot welding at different places, wherein material for the spot welding is a material having a different metallic crystal structure than that of the steel members.

9 Claims, 6 Drawing Sheets

FIG. 5

| DESIGNATION | | MATERIAL | METALLIC CRYSTAL STRUCTURE | BEAD BRAKING POSITION AFTER TENSILE TEST |
|---|---|---|---|---|
| FLANGE | | S10c | bcc | |
| MAIN PIPE (OR BRANCH PIPE) | | SUS430 | bcc | |
| SPOT WELDING BEAD | | SUSY430 | bcc | BOUNDARY +(IN PART) INSIDE |
| | | SWY11 | bcc | DITTO |
| | | SUSY309 | fcc | INSIDE ONLY |
| | | 70%Cu-30%Zn | | DITTO |

FIG. 6

| SPOT WELDING MATERIAL | | BREAKING OF SPOT WELDING BEADS | | |
|---|---|---|---|---|
| DESIGNATION | METALLIC CRYSTAL STRUCTURE | NUMBER OF BROKEN BEADS OF 24 BEADS | NUMBER OF BOUNDARY BROKEN BEADS | NUMBER OF INSIDE BROKEN BEADS |
| SUSY430 | bcc | 8 | 7 | 1 |
| SWY11 | | 11 | 9 | 2 |
| SUSY309 | fcc | 15 | 0 | 15 |
| 70%Cu-30%Zn | | 20 | 0 | 20 |

EXHAUST MANIFOLD

BACKGROUND OF THE INVENTION

1. Field of the Invention

The present invention relates to an exhaust manifold made of steel of the welding construction, which is used for an internal combustion engine.

2. Description of the Prior Art

Examples of the conventional exhaust manifold made of steel of the welding construction are as follows (refer to Japanese Utility Model Provisional Publication No. 62-108516).

There is an exhaust manifold, as shown in FIG. 7, in which a main pie 1 or a branch pipe 2 and a flange 3 as well as the main pipe 1 and the branch pipe 2 are connected with each other all over the circumference by permanent welding. As to the way of connection, two parts are welded and jointed by parmanent welding beads 11 and 12 as shown in FIGS. 8 and 9.

Further, there is another exhaust manifold having spot welding as temporary one in addition to the above-mentioned parmanent welding as shown in FIG. 10. Two ways of spot welding can be adopted: one in which, as shown in FIG. 11, a spot welding bead 13 is located at a different point than that of a permanent welding bead 11 and thereafter permanent welding is carried out; and the other in which, as shown in FIG. 12, a permanent welding bead 12 is applied on a spot welding bead 14.

A primary object of the execution of spot welding is to prevent deterioration of assembly precision and/or displacement of assembly disportion caused by thermal stress of welding in case only permanent welding is carried out (FIGS. 7-9) and/or to make in part a contribution to rigidity on use.

In regard to permanent welding bead material, it is to be noted that, when materials having the same metallic crystal structure "common material" are used for the main pie 1, the branch pipe 2 and the flange 3, the common material is naturally adopted in consideration of countermeasure against producing thermal fatigue crack. Further, the common material is generally used as spot welding bead material.

However, in the above-mentioned conventional exhaust manifold made of steel of welding construction, the common material of the main pie 1, the branch pipe 2 and the flange 3 is used in spot welding as temporary welding, so that, as shown in FIG. 13, if crack is produced at the spot welding bead 13 on use, the crack will develop from the point 0 to the main pipe 1 or the branch pipe 2 and grow to a through hole after a while. Thus, exhaust gas passing through an exhaust passage 31 will leak in the air resulting in deterioration of engine performance and endurance.

SUMMARY OF THE INVENTION

It is, therefore, an object of the present invention to provide an exhaust manifold in which cracks produced at a spot welding bead may not develop into the main pipe or the branch pipe.

According to the present invention, there is provided an exhaust manifold comprising a plurality of steel members having the same metallic crystal structure in the range of working temperature, which are joined with each other by permanent welding and spot welding at different points, wherein material for said spot welding is a material having the different metallic crystal structure than that of said steel members.

BRIEF DESCRIPTION OF THE DRAWINGS

FIGS. 5 and 6 are tables indicating results of endurance tests.

DETAILED DESCRIPTION OF THE INVENTION

Figure 1:
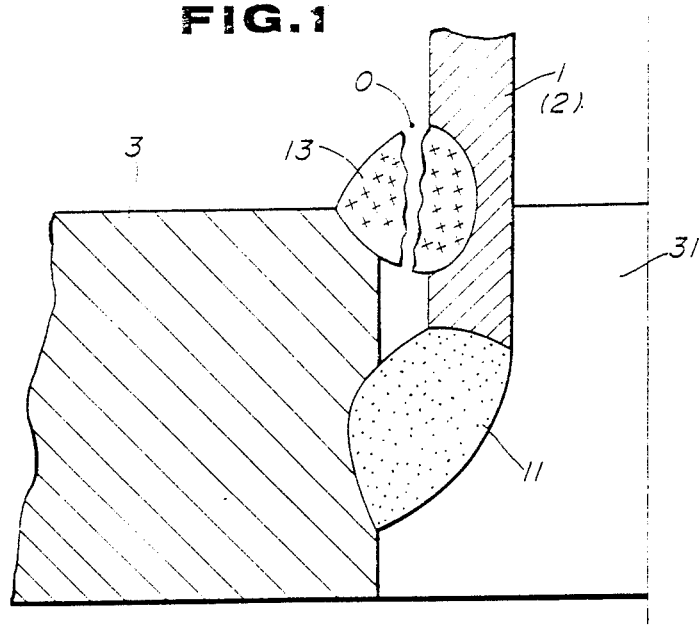
FIG. 1 is a sectional view of an exhaust manifold according to the present invention.
Figure 13:
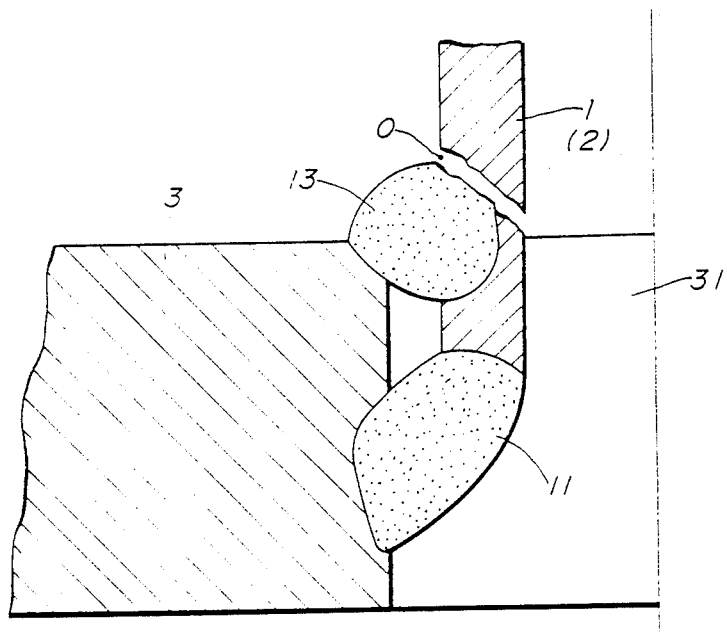
FIG. 13 is a similar view to FIG. 1, but showing the conventional problem discussed above.

Detailed description will be made with respect to results of test piece test carried out for selecting spot welding materials of the present invention. Referring to FIG. 1, there is shown substantially the same structure as shown in FIG. 13 except that a spot welding bead 13 is made of a material as a result of the test.

Figure 2:
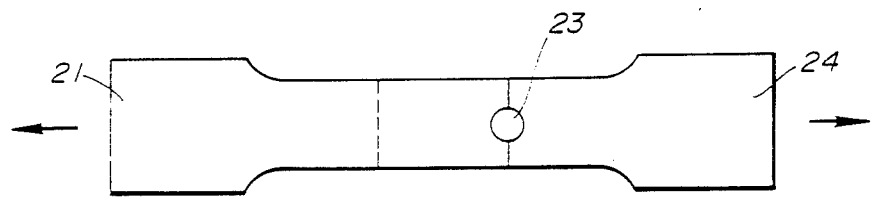
FIG. 2 is a plan view of a test piece.
Figure 3:
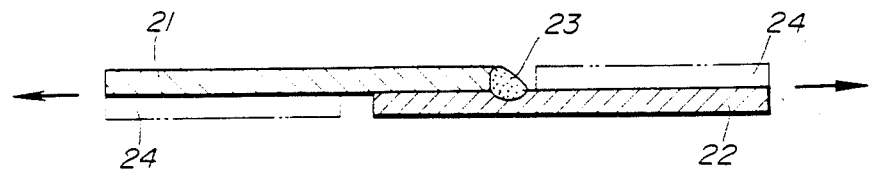
FIG. 3 is a sectional side elevation of the test piece.

FIGS. 2 and 3 show a test piece for tensile test. The test piece was formed by piling flange material 21 and main pipe material (or branch pipe material) 22 and then welding by spot welding 23 of a constant (approx. 5 mm) diameter.

Next, FIG. 5 shows materials used for the test piece. The flange material 21 and the main pipe material (or branch pipe material) 22 were selected out of materials having the same metallic crystal structure, i.e., bcc (body-centered cubic) structure, the flange material 21 was carbon steel S10C and the main pipe material (or branch pipe material) 22 was heat resistant steel SUS430. Further, the following materials were used as spot welding material: two ones having the same bcc structure, i.e., heat resistant steel SUSY430 or carbon steel SWY11 (equivalent to S10C) as comparative material and two other ones having the different metallic crystal structure, i.e., fcc (face-centered cubic) structure, i.e., heat resistant steel SUSY309 or brass alloy of 70% Cu—30% Zn.

The tensile test was performed on test pieces prepared as described above thereby to compare bead breaking positions after producing the tensile breaking. In regard to test conditions, it is noted, as shown in FIG. 3, that dolly 24 was employed to obtain the single axis tension by excluding the effect such as bending stress, etc. It is also noted that test temperature was 400° C. determined after due consideration of the observed maximum temperature of spot welding portion on practical use as a part.

Results of the tensile test on test pieces are shown in the right column of the table of FIG. 5. Bead breaking position was located at the boundary of bead and/or partially in the bead itself as for the spot welding materials (SUSY430 and SWY11) which have the same metallic crystal structure (bcc structure) as that of the main pipe material (or branch pipe material) and the flange material. Accordingly, on practical use, there may frequently arise the problem of exhaust gas leak as shown in FIG. 13. On the other hand, the breaking position was located quite only in the bead itself for the spot welding materials (SUSY309 and 70% Cu—30% Zn alloy) which have the different metallic crystal structure (fcc structure) than that of the main pipe material (or branch pipe material) and the flange material. Accordingly, as shown in FIG. 1, result was obtained indicating the fact that, on practical use, exhaust gas might not leak in the air.

Next, description will be made with respect to results of endurance test on engine stand for actual exhaust manifold parts produced in a similar way to the test pieces.

Material for the exhaust manifold parts were identical, as shown in FIG. 6, to those of FIG. 5.

Figure 4:
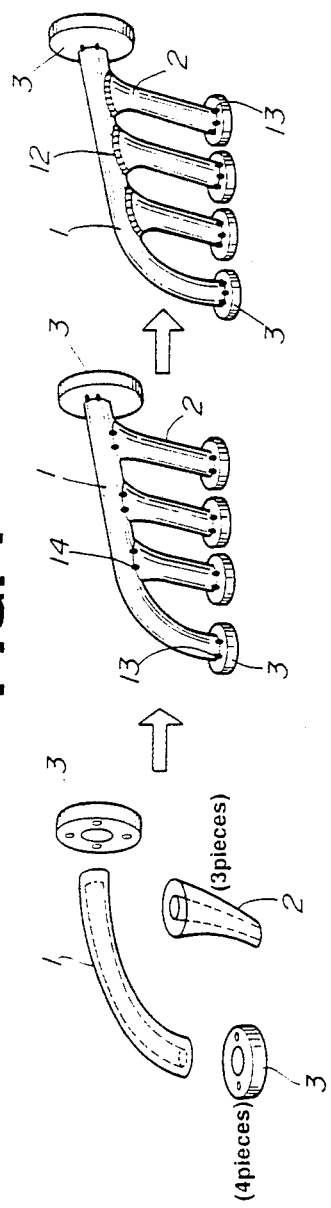
FIG. 4 is a diagram showing an assembly process.
Figure 7:
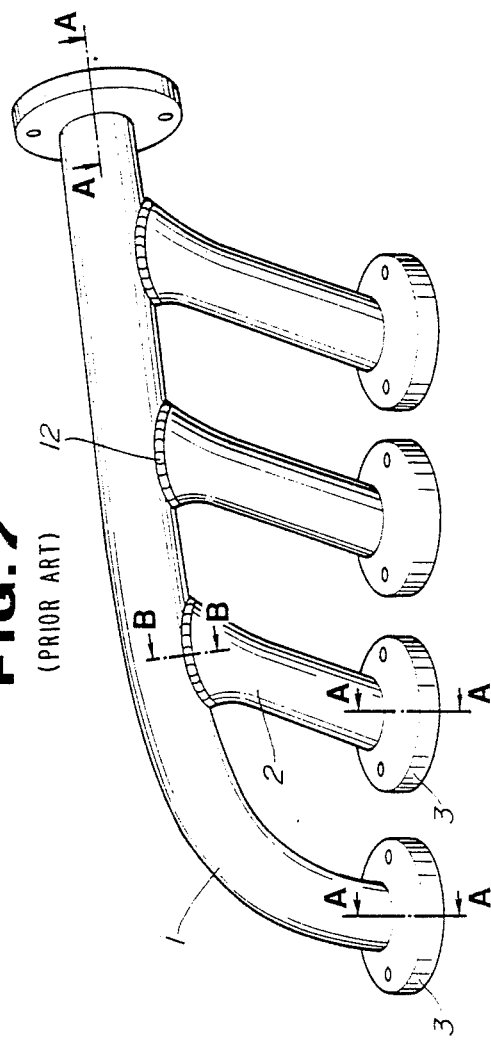
FIG. 7 is a general view of a conventional exhaust manifold having permanent welding only.
Figure 8:
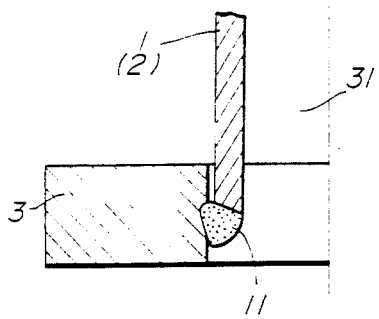
FIG. 8 is a sectional view taken on line A—A of FIG. 7.
Figure 9:
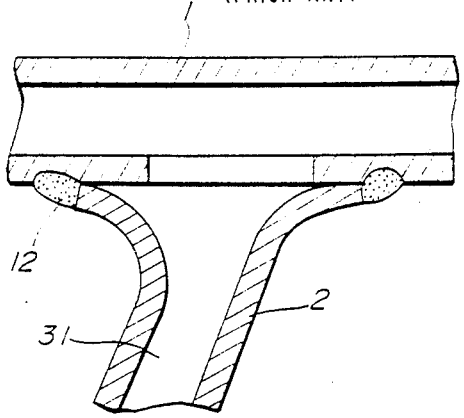
FIG. 9 is a sectional view taken on line B—B of FIG. 7.
Figure 10:
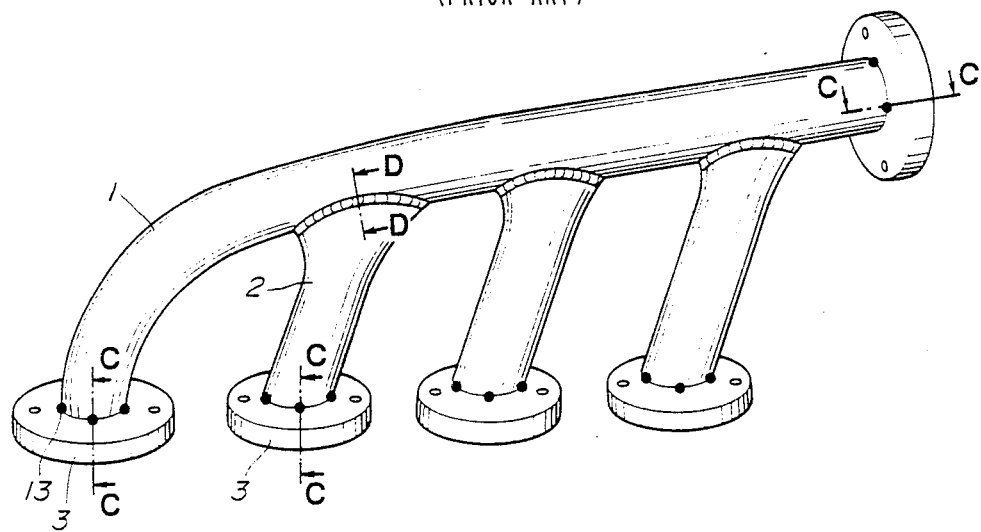
FIG. 10 is a general view of another conventional exhaust manifold having a spot welding.
Figure 11:
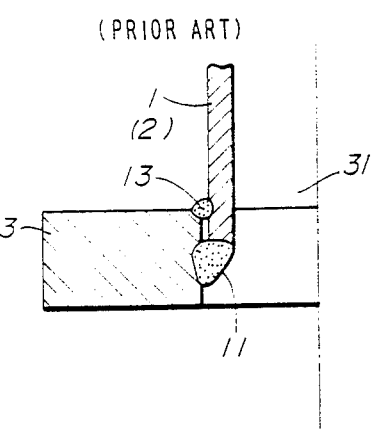
FIG. 11 is a sectional view taken on line C—C of FIG. 10.
Figure 12:
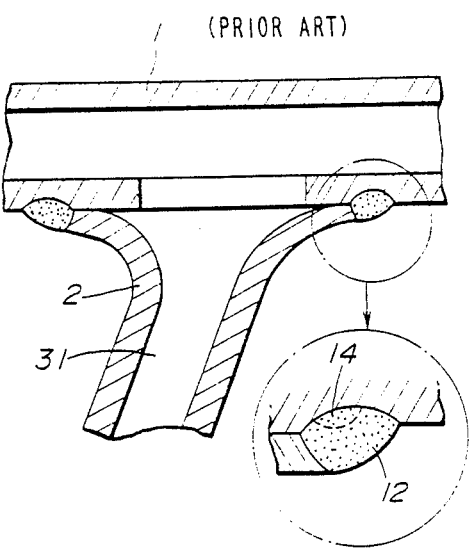
FIG. 12 is a sectional view taken on line D—D of FIG. 10.

FIG. 4 shows assembly process of the exhaust manifold parts. First, each of the parts was welded temporarily by a plurality of spot welding points and thereafter permanently all over the circumference. After permanent welding, stress relief annealing was performed thereby to eliminate residual stress caused by welding.

In regard to engine displacement, V-type 6 cylinders 3 litters was adopted. Setting the maximum number of revolution at 6000 rpm and performing thermal cycle endurance test up to 500 cycle under the full load condition, the bead breaking position was compared for 24 spot welding points of an engine upon completition of the endurance test.

FIG. 6 shows results of the endurance test on engine stand for actual manifold parts. It is to be noted that, as shown in the table of FIG. 6, most of spot welding beads of SUSY430 or SWY11 having the same metallic crystal structure as the main pipe material (or branch pipe material) and the flange material in the range of working temperature were broken along the boundary of bead and that, as shown in FIG. 13, for some of them, there was through crack by development of crack into the main pipe (or branch pipe). On the other hand, it is to be noted that, as shown in FIG. 1, all spot welding beads of SUSY309 or 70% CU—30% Zn alloy having the different metallic crystal structure in the range of working temperature were broken only in the bead itself and that there was not any crack into the main pipe (or branch pipe material) causing an exhaust gas leak in the air.

Where a spot welding portion is welded again by successive permanent welding, spot welding material having the coefficient of linear expansion nearly identical to that of permanent welding material, i.e., the same metallic crystal structure, is used although it has a different metallic crystal structure from the parts of the exhaust manifold have, so as to decrease the difference in thermal stress that is induced by thermal expansion and/or contraction of the parts of the exhaust manifold when the exhaust manifold is in use.

Accordingly, even if breaking occurs at a spot welding bead on use of the manifold, breaking crack will develop only in the bead itself so that it is possible to prevent production of through crack of a main pipe, etc.

As described above, according to the present invention, when a spot welding portion is not welded again by permanent welding, materials having the different metallic crystal structure than that of at least two steel members to be connected with each other are used as spot welding material, so that, if breaking is occured at a spot welding bead on use, breaking crack will develop only in the bead itself without producing through crack of a main pipe, etc., thus there will be no deterioration of performance and/or life of the manifold caused by exhaust gas leak in the air.

What is claimed is:

1. An exhaust manifold comprising: a plurality of steel members constituted from a material which reveals a body-centered cubic metallic crystal structure when exposed to a predetermined temperature range, said plurality of steel members comprise a plurality of pipes and a plurality of flanges which are arranged to form a unitary structure with first and second connecting portions between adjacent ones of said plurality of steel members, said first connecting portions comprising a plurality of spot welding beads constituted from a material which reveals a face-centered cubic metallic crystal when exposed to said predetermined temperature range and said second connecting portions comprising a permanent welding bead constituted from a material which reveals said body-centered metallic crystal structure when exposed to said predetermined temperature range.

2. An exhaust manifold as claimed in claim 1, wherein said plurality of pipes are made of a heat resistant steel.

3. An exhaust manifold as claimed in claim 1, wherein said plurality of spot welding beads are made of a heat resistant steel.

4. An exhaust manifold as claimed in claim 1, wherein said plurality of spot welding beads are made of a brass alloy of 70% Cu—30% Zn.

5. An exhaust manifold comprising:
a plurality of steel members including a plurality of pipes, and a plurality of flanges, said plurality of steel members constituted from a material which reveals a body-centered cubic metallic crystal structure when exposed to a predetermined temperature range;
said plurality of steel members including two predetermined members;
a plurality of spot welding beads disposed between said two predetermined members at first portions to establish a connection therebetween, said plurality of spot welding beads constituted from a material which reveals a face-centered cubic metallic crystal structure when exposed to said predetermined temperature range;
a permanent welding bead disposed between said two predetermined members at a second portion different from said first portions to establish a connection therebetween, said welding bead constituted from a material which reveals said body-centered cubic metallic crystal structure when exposed to said predetermined temperature range.

6. An exhaust manifold as claimed in claim 5, wherein said plurality of pipes are made of a heat resistant steel.

7. An exhaust manifold as claimed in claim 5, wherein said plurality of flanges are made of a carbon steel.

8. An exhaust manifold as claimed in claim 5, wherein said plurality of spot welding beads are made of a heat resistant steel.

9. An exhaust manifold as claimed in claim 5, wherein said plurality of spot welding beads are made of a brass alloy of 70% Cu—30% Zn.

* * * * *